United States Patent
Ringenberg et al.

(10) Patent No.: US 12,192,072 B2
(45) Date of Patent: Jan. 7, 2025

(54) VIRTUAL REALITY CONTENT STREAMING BASED ON QUALITY OF EXPERIENCE LEVEL

(71) Applicant: Charter Communications Operating, LLC, St. Louis, MO (US)

(72) Inventors: Matthew Ringenberg, Denver, CO (US); Dhananjay Lal, Englewood, CO (US); Dell Wolfensparger, Langley, WA (US); Andrew Ip, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 451 days.

(21) Appl. No.: 16/786,565

(22) Filed: Feb. 10, 2020

(65) Prior Publication Data

US 2021/0250257 A1 Aug. 12, 2021

(51) Int. Cl.
| | |
|---|---|
| *H04L 41/5067* | (2022.01) |
| *G02B 27/00* | (2006.01) |
| *G02B 27/01* | (2006.01) |
| *G06T 19/00* | (2011.01) |
| *H04L 41/5009* | (2022.01) |
| *H04L 43/0852* | (2022.01) |
| *H04L 47/283* | (2022.01) |
| *H04W 28/18* | (2009.01) |

(52) U.S. Cl.
CPC ...... *H04L 41/5067* (2013.01); *G02B 27/0093* (2013.01); *G02B 27/0172* (2013.01); *G06T 19/006* (2013.01); *H04L 41/5009* (2013.01); *H04L 43/0858* (2013.01); *H04L 47/283* (2013.01); *H04W 28/18* (2013.01); *G02B 2027/0187* (2013.01)

(58) Field of Classification Search
None
See application file for complete search history.

(56) References Cited

U.S. PATENT DOCUMENTS

| | | | | |
|---|---|---|---|---|
| 2011/0283011 | A1* | 11/2011 | Li | H04L 67/143 |
| | | | | 709/231 |
| 2017/0288865 | A1* | 10/2017 | Amidei | H04N 21/4621 |
| 2018/0091629 | A1* | 3/2018 | de la Pena | G06F 3/04815 |
| 2019/0222491 | A1* | 7/2019 | Tomkins | H04L 41/5038 |
| 2020/0037029 | A1* | 1/2020 | He | H04N 21/816 |
| 2020/0314897 | A1* | 10/2020 | Bendigeri | H04W 76/10 |
| 2020/0322696 | A1* | 10/2020 | Dvir | H04N 21/2402 |
| 2021/0366204 | A1* | 11/2021 | Thiebaud | G06T 19/20 |

* cited by examiner

*Primary Examiner* — Derrick W Ferris
*Assistant Examiner* — Keith Follansbee
(74) *Attorney, Agent, or Firm* — Dority & Manning, P.A.

(57) ABSTRACT

Virtual reality content (VR content) streaming based on quality of experience level is disclosed. In response to a request from a head-mounted display device (HMDD) to serve a VR content, a computing device determines a head motion quantifier (HMQ) associated with the VR content. The computing device is configured to dynamically provide to the HMDD imagery from the VR content based on head movements of a user of the HMDD. The computing device determines a latency value associated with a round-trip time of data between the computing device and the HMDD. The computing device determines a quality of experience level of a plurality of different quality of experience levels based on the HMQ and the latency value, and performs an action based on the quality of experience level.

19 Claims, 5 Drawing Sheets

VIRTUAL REALITY CONTENT STREAMING BASED ON QUALITY OF EXPERIENCE LEVEL

BACKGROUND

Head-mounted display devices (HMDDs) are often used to provide an immersive experience to a user in a virtual world. In a streaming virtual reality environment, where high-resolution imagery is provided over a network to an HMDD, latency can negatively impact the quality of the experience for the user.

SUMMARY

The embodiments relate to a streaming VR system wherein a computing device is configured to dynamically stream imagery of a virtual world over a network to an HMDD in response to movements and actions of a user wearing the HMDD. Upon receiving a request to serve virtual reality content (VR content) to an HMDD, a latency value is determined that is at least partially based on a round trip time of data communicated between the computing device and the HMDD. A head motion quantifier (HMQ) associated with the VR content is also determined. Based on the latency value and the HMQ, a quality of experience level likely to be experienced by the user is determined. Based on the quality of experience level, an action is performed.

In one embodiment a method is provided. The method includes determining, by a computing device in response to a request from a head-mounted display device (HMDD) to serve a virtual reality content (VR content), a head motion quantifier (HMQ) associated with the VR content, wherein the computing device is configured to dynamically provide to the HMDD imagery from the VR content based on head movements of a user of the HMDD. The method further includes determining, by the computing device, a latency value associated with a round-trip time of data between the computing device and the HMDD. The method further includes determining a quality of experience level of a plurality of different quality of experience levels based on the HMQ and the latency value, and performing an action based on the quality of experience level.

In another embodiment a computing device is provided. The computing device includes a memory, and a processor device coupled to the memory. The processor device is configured to determine, in response to a request from a head-mounted display device (HMDD) to serve a virtual reality content (VR content), a head motion quantifier (HMQ) associated with the VR content, wherein the processor device is configured to dynamically provide to the HMDD imagery from the VR content based on head movements of a user of the HMDD. The processor device is further configured to determine a latency value associated with a round-trip time of data between the computing device and the HMDD. The processor device is further configured to determine a quality of experience level of a plurality of different quality of experience levels based on the HMQ and the latency value, and perform an action based on the quality of experience level.

In another embodiment a computer program product is provided. The computer program product is stored on a non-transitory computer-readable storage medium and includes instructions configured to cause a processor device to determine, in response to a request from a head-mounted display device (HMDD) to serve a virtual reality content (VR content), a head motion quantifier (HMQ) associated with the VR content, wherein the processor device is configured to dynamically provide to the HMDD imagery from the VR content based on head movements of a user of the HMDD. The instructions are further configured to cause the processor device to determine a latency value associated with a round-trip time of data between the computing device and the HMDD. The instructions are further configured to cause the processor device to determine a quality of experience level of a plurality of different quality of experience levels based on the HMQ and the latency value. The instructions are further configured to cause the processor device to perform an action based on the quality of experience level.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Head-mounted display devices (HMDDs) are often used to provide an immersive experience to a user in a virtual world. In a streaming virtual reality environment, where high-resolution imagery is provided over a network to an HMDD, latency can negatively impact the quality of the experience for the user.

Image-rendering graphics processing units (GPUs) can require a substantial amount of power, may be relatively costly, and may even require a cooling system to prevent overheating. Accordingly, in order to make an HMDD lightweight and compact, and therefore comfortable for a user, an HMDD may lack an image-rendering GPU. Instead, a computing device with one or more GPUs may, in real-time, generate and stream to the HMDD virtual world imagery that depicts the virtual world based on the current virtual location of the user in the virtual world, and the current orientation (including the direction) of the view of the user in the virtual world.

In practice, any number of switches, bridges, routers or other communications devices (referred to generally herein as "switch devices") may be in the communications path between the image-rendering computing device and the HMDD. Moreover, in some implementations, there may be a relatively large physical distance between the image-rendering computing device and the HMDD. These and other factors can result in latency. Latency, as used herein, refers to the delay of time that it takes for a signal communicated from one device, such as an image-rendering computing device, to reach another device, such as an HMDD. Latency may be a result of any number of factors, including, by way of non-limiting example, physical distance between the image-rendering computing device and the HMDD, the number of switch devices in the communications path between the image-rendering computing device and the HMDD, network conditions, the types of media used to interconnect devices in the communications path, changing load conditions on one or more of the devices, and the like.

An HMDD has a field of view (FOV) that defines a horizontal and vertical extent of what a user in a virtual world can perceive at an instant in time. An FOV is often defined in terms of horizontal degrees and vertical degrees. As a user in a virtual world moves about the virtual world, the HMDD continuously provides orientation and movement data to the image-rendering computing device. As the user moves her head, the scene encompassed by the FOV of the HMDD changes, similar or identical to the manner in which the scene within the FOV of human eyes change as a human moves her ahead about the real world.

If a user moves their head slowly in a virtual world, the delay of time between the HMDD sending a current location and orientation of the HMDD, the rendering of the corresponding imagery, the communication of the rendered imagery to the HMDD and the presentation of the rendered imagery on the HMDD to the user may result in few or no visual discontinuities. However, where a user relatively rapidly moves their head about a virtual world, the delay of time may result in substantial visual discontinuities in the form of banding, blacked-out portions of the scene, or the like, which may lead to an unpleasant experience for the user. This may occur, for example, when the orientation of the HMDD changes such that a new portion of the virtual world is within the FOV of the HMDD, and a new frame depicting that new portion of the virtual world is not received before the HMDD is refreshed. In this situation, the new portion of the virtual world will be depicted via some image texture, such as a black image texture.

The embodiments disclosed herein relate to a streaming VR system wherein a computing device is configured to dynamically stream imagery of a virtual world over a network to an HMDD in response to movements and actions of a user wearing the HMDD. The embodiments, upon receiving a request to serve virtual reality content (VR content) to an HMDD, determine a latency value that is at least partially based on a round trip time of data communicated between the computing device and the HMDD. The embodiments also determine a head motion quantifier (HMQ) associated with the VR content. The HMQ quantifies rotation velocities of a head of a nominal user participating in a virtual world implemented by the VR content. The HMQ may be determined, for example, experimentally by observing and measuring head motions of users participating in the VR content. The embodiments then, based on the latency value and the HMQ, determine a quality of experience level likely to be experienced by the user. The embodiments, based on the quality of experience level, perform an action, such as, by way of non-limiting example, informing the user that the quality of experience level will be undesirable, or, if the quality of experience level will be desirable, by serving the VR content to the HMDD, or, a different computing device with a lower latency value with respect to the HMDD may be directed to serve the VR content.

Figure 1:
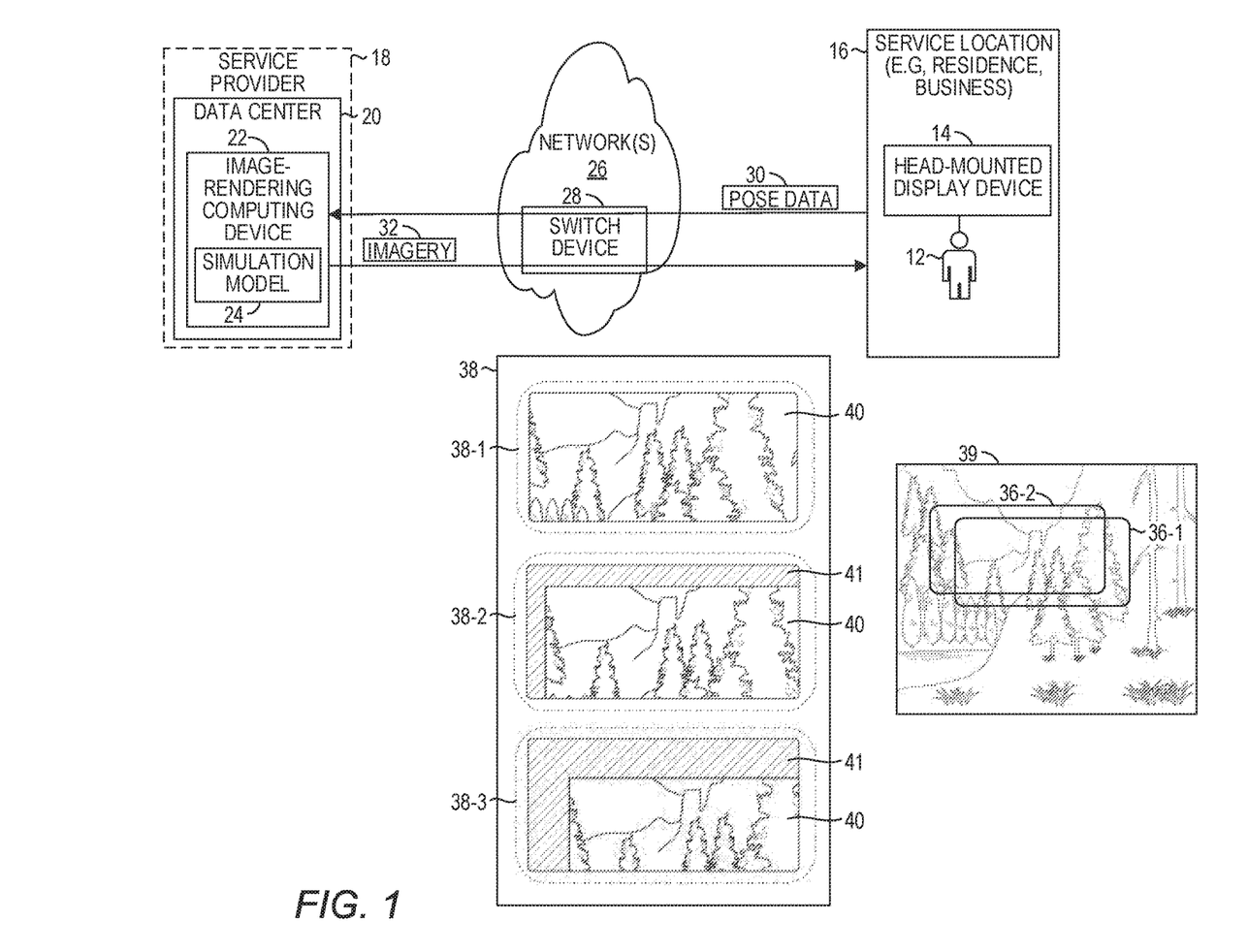
FIG. 1 is a block diagram of an environment that may be utilized to stream virtual reality content.

FIG. 1 is a block diagram of a streaming VR environment 10 that may be utilized to stream VR content according to one embodiment. The streaming VR environment 10 includes a user 12 who is wearing an HMDD 14. The HMDD 14 has an associated FOV, such as, by way of non-limiting example, an FOV of 80° horizontal and 60° vertical. The user 12 in this example is in a service location 16, such as a residence or business, which obtains service from a service provider 18. The service provider 18 maintains one or more data centers 20. The data center 20 includes an image-rendering (IR) computing device 22 (hereinafter computing device 22 for purposes of brevity) and a simulation model 24 that reflects a current state of a virtual world that the user 12 is participating in. The computing device 22 dynamically serves imagery of the virtual world to the HMDD 14 based on the simulation model 24 in response to movements and actions of the user 12.

The data center 20 is communicatively coupled to the HMDD 14 via one or more networks 26. The network 26 may include one or more different transmission mediums, such as, by way of non-limiting example, an optical transmission medium, an electrical transmission medium, a wireless transmission medium, or any combination thereof. The network 26 includes at least one intermediate switch device 28 that comprises a router, a switch, a bridge, an optical-to-electrical converter, an electrical-to-optical converter, or the like.

In this example, the user 12 is participating in a virtual world implemented by the simulation model 24. The HMDD 14 relatively continuously streams information to the computing device 22 via the network 26 that identifies actions taken by the user 12, such as activation of weapons, location movements, and the like. The computing device 22 continuously updates the simulation model 24 in response to the actions taken by the user 12 to reflect a current state of the virtual world. The HMDD 14 also relatively continuously streams pose data 30 that identifies an orientation of the HMDD 14. The pose data 30 may include, for example, roll, yaw and pitch data generated by an inertial measurement unit sensor (IMU) of the HMDD 14. In some embodiments, the HMDD 14 may pre-process the roll, yaw and pitch data to generate the pose data 30.

The computing device 22 receives the pose data 30 and, iteratively, based on the most recently received pose data 30, determines a scene within the virtual world that is within an FOV of the HMDD 14. The computing device 22 renders imagery 32 that depicts the scene based on the state of the simulation model 24 at that instant in time, the orientation of the HMDD 14 identified in the pose data 30, and the FOV of the HMDD 14, and sends the imagery 32 to the HMDD 14 via the network 26. The HMDD 14 receives the imagery 32 and presents the imagery 32 on a display device of the HMDD 14 for viewing by the user 12. This process happens periodically, such as 30 or 60 times a second. In this manner, the user 12 can be presented with imagery of the virtual world consistent with movements of the user 12, resulting in an enjoyable immersive experience for the user 12.

Latency can result in visual discontinuities that are unpleasant for the user 12. As an example, assume that at a time T1 the HMDD 14 is at a first orientation, and at the first orientation, the FOV of the HMDD 14 encompasses a scene 36-1 of a portion 39 of a virtual world implemented by the simulation model 24. The HMDD 14 generates and sends the pose data 30 that identifies the first orientation. The computing device 22 generates the imagery 32 that depicts the scene 36-1 of the portion 39 of the virtual world. In between the time the pose data 30 was sent to the computing device 22 and before the imagery 32 is presented on the display device of the HMDD 14, the user 12 moves her head such that the HMDD 14 is now at a second orientation which encompasses a scene 36-2 of the portion 39 of the virtual world. The rapid change in orientation of the HMDD 14 can result in visual discontinuities. The extent of visual discontinuity is generally based on two factors 1) latency in the network 26, and the head motion of the user 12. The greater the latency in the network 26, the greater the likelihood of and extent of a visual discontinuity. Moreover, the more rapid and the greater amount of a head movement of the user 12, the greater the likelihood of and extent of a visual discontinuity.

Inset 38 provides examples 38-1-38-3 of what the user 12 may see in the HMDD 14 under various circumstances. The example 38-1 illustrates an image 40 presented in the HMDD 14 that has no visual discontinuities. This results in a desirable quality of experience level for the user 12, and is the goal of the service provider 18. This may occur, for example, where latency is very low, and/or where the head movements of the user 12 are very slow. The head movements may differ depending on the particular virtual world content. For example, if the virtual world content is a chess-oriented or checkers-oriented virtual world content, the user 12 may move their head slowly while carefully analyzing a chess board or checkers board, thus minimizing the negative effects of latency in the network 26. If on the other hand, the virtual world content is a third-person shooter virtual world content, the user 12 may rapidly move her head to ensure she sees other users in the virtual word before they see her, and may do so repeatedly.

The example 38-2 illustrates a portion of the image 40 presented in the HMDD 14 and a slight visual discontinuity wherein a portion of the display device of the HMDD 14 depicts black or darkened bands 41. This level of visual discontinuity may provide a moderate quality of experience that the user 12 can tolerate and still enjoy participating in the virtual world. The example 38-3 illustrates a portion of the image 40 presented in the HMDD 14 and a significant visual discontinuity wherein a relatively substantial portion of the display device of the HMDD 14 depicts black or darkened bands 41. This level of visual discontinuity may provide an undesirable quality of experience for the user 12.

Figure 2:
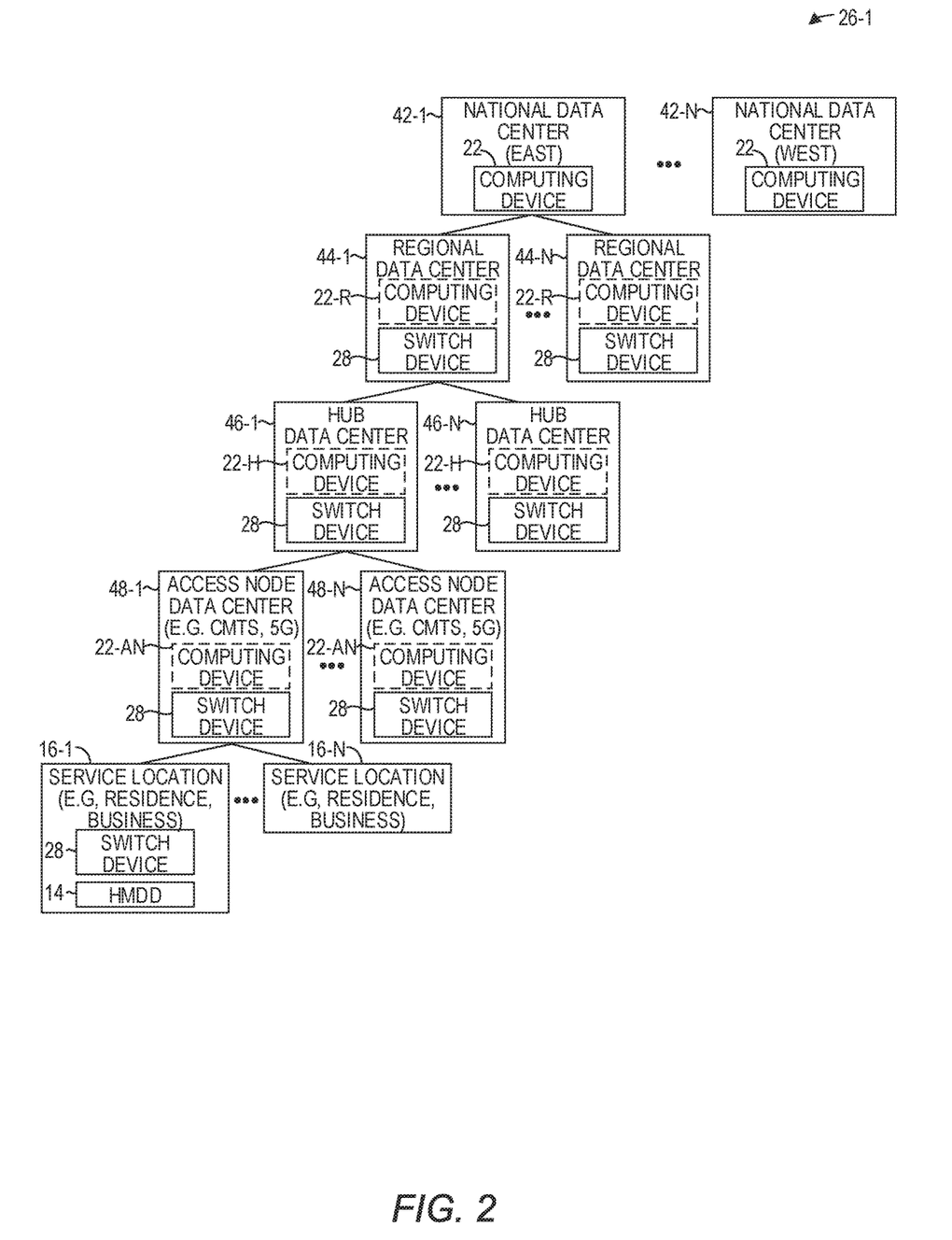
FIG. 2 is a block diagram illustrating a network that may be utilized to stream virtual reality content based on quality of experience level.

FIG. 2 is a block diagram illustrating a network 26-1 in accordance with one embodiment. In this embodiment, the network 26-1 is that of a national service provider that has one or more national data centers 42-1-42-N (generally, national data centers 42). Each national data center 42 may serve different regions of a country. Each national data center 42 may also include one or more image-rendering (IR) computing devices 22 that are suitable for rendering imagery of a virtual world. In other words, the IR computing devices 22 may contain suitable central processing units, graphics processing units and suitable electrical and cooling infrastructure suitable for high-resolution image generation.

Each of the national data centers 42 is communicatively coupled to a plurality of regional data centers 44-1-44-N (illustrated only with respect to the national data center 42-1 due to space considerations). The regional data centers 44-1-44-N may also have one or more IR computing devices 22-R. The regional data centers 44-1-44-N include one or more switch devices 28 which process communications that traverse through the respective regional data centers 44-1-44-N.

Each of the regional data centers 44-1-44-N is communicatively coupled to a plurality of hub data centers 46-1-46-N (illustrated only with respect to the regional data center 44-1 due to space considerations). The hub data centers 46-1-46-N may also have one or more IR computing devices 22-H suitable for rendering imagery. The hub data centers 46-1-46-N include one or more switch devices 28, which process communications that traverse through the respective hub data centers 46-1-46-N.

Each of the hub data centers 46-1-46-N is communicatively coupled to a plurality of access node data centers 48-1-48-N (illustrated only with respect to the hub data center 46-1 due to space considerations). The access node data centers 48-1-48-N may also have one or more IR computing devices 22-AN suitable for rendering imagery. The access node data centers 48-1-48-N include one or more switch devices 28, which process communications that traverse through the respective access node data centers 48-1-48-N.

Each of the access node data centers 48-1-48-N is communicatively coupled to one or more service locations 16-1-16-N (illustrated only with respect to the access node data center 48-1 due to space considerations). The service location 16-1 includes the HMDD 14, and may also include one or more switch devices 28, such as an optical-to-electrical converter and a local area network (LAN) router.

Imagery 32 (FIG. 1) generated by the computing device 22 of the national data center 42-1 and communicated to the HMDD 14 traverses through one or more switch devices 28 in the regional data center 44-1, one or more switch devices 28 in the hub data center 46-1, one or more switch devices 28 in the access node data center 48-1, and perhaps one or more switch devices 28 of the service location 16-1 prior to reaching the HMDD 14. Each of these switch devices 28 introduce at least a small amount of latency. Moreover, the national data center 42-1 may be geographically hundreds or thousands of miles from the service location 16-1, resulting in additional latency. The pose data 30 (FIG. 1) sent by the HMDD 14 to the computing device 22 of the national data center 42-1 traverses the same path, in reverse.

The network 26-1 is hierarchical, and each descending level has a greater number of data centers. Thus, there are a greater number of regional data centers 44 than national data centers 42, a greater number of hub data centers 46 than regional data centers 44, and a greater number of access node data centers 48 than hub data centers 46. Generating the imagery 32 in the access node data center 48-1 would reduce latency; however, the costs of provisioning each access node data center 48 with one or more IR computing devices 22, along with suitable electrical and cooling infrastructure, may be cost prohibitive. From a cost standpoint, it would be desirable to only provision the national data centers 42 with the IR computing devices 22 because there are fewer national data centers 42; however, the latency will be greatest in the communications path between the national data center 42-1 and the HMDD 14 than that of any other data center at a lower hierarchical level of the network 26-1 and the HMDD 14.

Some embodiments disclosed herein can help ensure that virtual world content is served from a computing device 22, 22-R, 22-H, 22-AN (generally, computing devices 22) at a highest hierarchical level of the network 26-1 possible while still providing a desirable quality of experience level. This helps minimize the number of computing devices 22 that may be necessary at the lower levels of the network 26-1, which may help reduce costs in view of the larger numbers of data centers at the lower hierarchical levels of the network 26-1.

Figure 3:
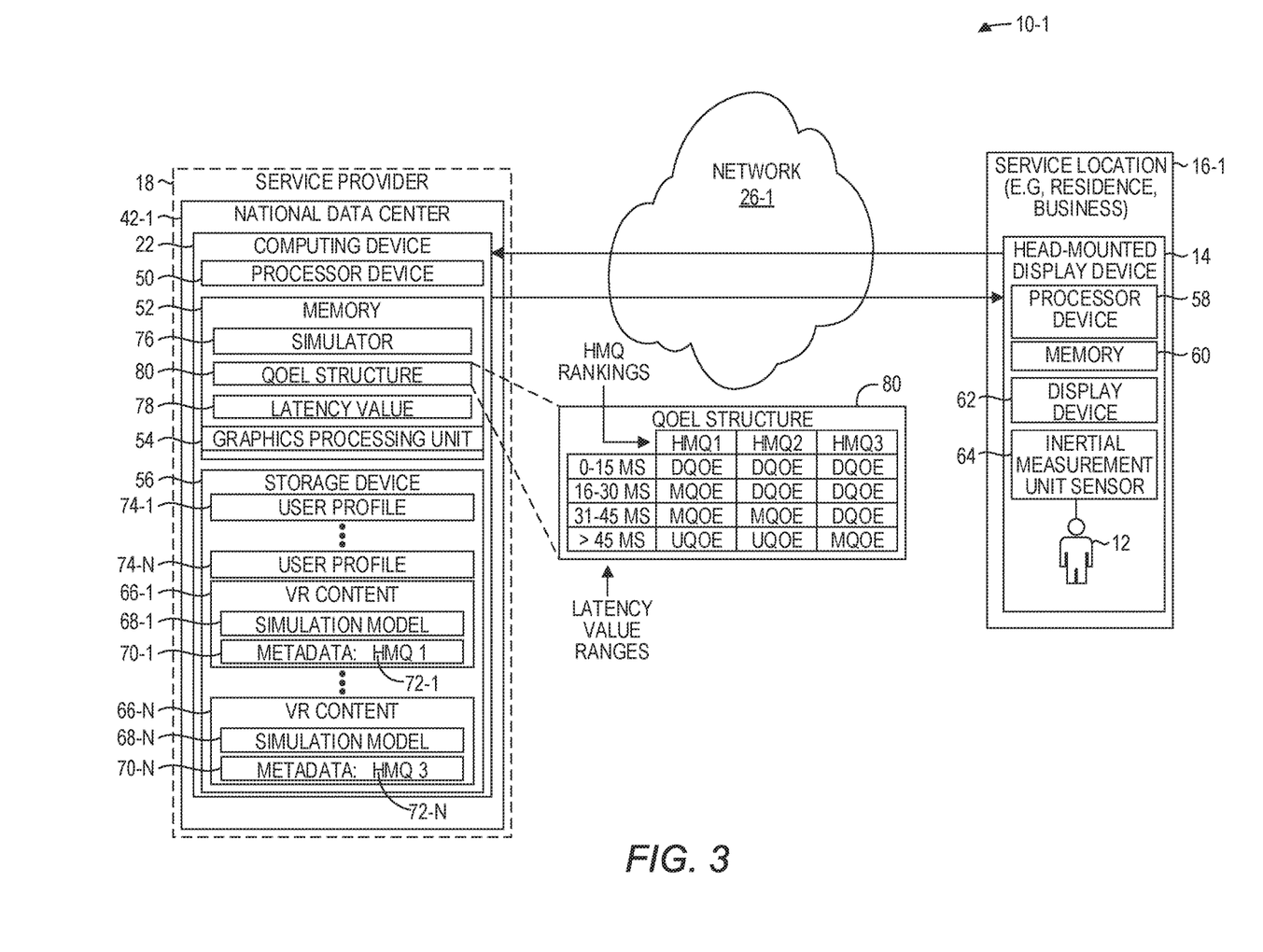
FIG. 3 is a block diagram of an environment suitable for streaming virtual reality content based on quality of experience level.

FIG. 3 is a block diagram of a streaming VR environment 10-1 suitable for streaming virtual reality content based on quality of experience level according to one embodiment. The streaming VR environment 10-1 includes the network 26-1, the national data center 42-1, and the service location 16-1, as illustrated in FIG. 2. The national data center 42-1 includes the computing device 22, which in turn includes a processor device 50, a memory 52 and a graphics processing unit 54. The computing device 22 includes, or is communicatively coupled to, a storage device 56.

The HMDD 14 includes a processor device 58, a memory 60, a display device 62 and an inertial measurement unit sensor (IMU) 64. The HMDD 14 is configured to be coupled to a head of the user 12, such as via a frame similar to glasses, or via straps, a helmet, a cap, or the like.

The computing device 22 has access to a plurality of different VR contents 66-1-66-N (generally, VR content 66) maintained on the storage device 56 and that may be selected by a user 12. Each VR content 66 implements a virtual world that can be experienced by the user 12 via the HMDD 14. As an example, a first VR content 66 may implement a first-person shooter virtual world, a second VR content 66 may implement a chess game virtual world, and a third VR content may implement a medieval virtual world in which the user 12 can move about and explore at her leisure.

Each of the VR contents 66-1-66-N has a corresponding starting simulation model 68-1-68-N that identifies objects in the virtual world and initial states of such objects. Each of the VR contents 66-1-66-N also includes metadata 70-1-70-N that contains information about the corresponding VR contents 66-1-66-N. The metadata 70-1-70-N includes corresponding head-movement quantifiers (HMQ) 72-1-72-N (generally, HMQ 72). Each HMQ 72 corresponds to a maximum rotation velocity of a head of a user participating in the virtual world implemented by the corresponding VR content 66. As an example, a user in a chess game virtual world may move their head very slowly and in very small rotational movements, while a user in a first-person shooter virtual world may move their head rapidly and in relatively large rotational movements. The storage device 56 may also include a plurality of user profiles 74-1-74-N that include information about subscribers of the service provider 18.

The HMQs 72 may be provided by a developer of the corresponding VR content 66, may be determined experimentally by monitoring a number of users over a period of time participating in the corresponding virtual world, and/or may be determined based on the real-world activities of users participating in virtual worlds implemented by the VR contents 66.

In some embodiments an HMQ 72 may be a rank. The ranking system may be of any granularity, such as three ranks, five ranks, ten ranks, or the like. Each rank may correspond to a different maximum rotation velocity of a head of a user in some desired units, such as, by way of non-limiting example, degrees per second, or radians per second. For example, in a three-rank HMQ system, rank 1 may equate to 40 degrees per second, rank 2 may correspond to 25 degrees per second, and rank 3 may correspond to 10 degrees per second. In other embodiments, the HMQs 72 identify an actual rotation velocity of a head in some desired units, such as, by way of non-limiting example, degrees per second, or radians per second. Solely for purposes of discussion and illustration, FIG. 3 will be discussed in conjunction with a ranking system wherein there are three HMQ ranks, rank 1 is identified as HMQ1 and corresponds to a head movement of 40 degrees per second or higher; rank 2 is identified as HMQ2 and corresponds to a head movement between 39 and 25 degrees per second; and rank 3 is identified as HMQ3 and corresponds to a head movement of less than 25 degrees per second.

For purposes of illustrating streaming virtual reality content based on quality of experience level, assume that the user 12 desires to participate in a virtual world. The user 12 may manipulate the HMDD 14, or another device located in the service location 16-1, to cause the computing device 22 to provide a menu of selection of the VR contents 66-1-66-N. The user 12 selects the VR content 66-1. The computing device 22 includes a simulator 76. It is noted that because the simulator 76 is a component of the computing device 22, functionality implemented by the simulator 76 may be attributed to the computing device 22 generally. Moreover, in examples where the simulator 76 comprises software instructions that program the processor device 50 to carry out functionality discussed herein, functionality implemented by the simulator 76 may be attributed herein to the processor device 50.

The simulator 76 accesses the metadata 70-1 to determine the HMQ 72-1 associated with the VR content 66-1. The simulator 76 also determines a latency value 78 associated with a round-trip time of data communicated from the computing device 22 through the network 26-1 to the HMDD 14 and receipt, by the computing device 22, of a response from the HMDD 14 to the signal. In some embodiments, the latency value 78 may also include an amount of time that represents an expected processing time of the computing device 22 and the HMDD 14, such as the processing time necessary for the computing device 22 to render an image of the virtual world and encode the image, and the processing time necessary for the HMDD 14 to decode the image.

The latency value 78 may be determined in any number of manners. In one embodiment, the computing device 22 may periodically send an internet control message protocol (ICMP) echo request to the HMDD 14, receive a response to the ICMP echo request from the HMDD 14, and determine the amount of time between sending the ICMP echo request and receiving the response to the ICMP echo request. The computing device 22 may also add a predetermined value to that amount of time to account for image processing performed by the computing device 22 and the HMDD 14.

The simulator 76 then determines a quality of experience level based on the HMQ 72-1 and the latency value 78. In one embodiment, the simulator 76 accesses a quality of experience level (QOEL) structure 80 to determine the quality of experience level. The QOEL structure 80, in this embodiment, is a matrix comprising columns of the three different HMQ rankings, HMQ1, HMQ2, and HMQ3, and rows of four different latency value ranges. At the intersection of each column and row is a quality of experience level based on the value of that particular latency value range and that particular HMQ ranking. In this embodiment, the quality of experience levels comprise Desirable Quality of Experience (DQOE), Moderate Quality of Experience (MQOE), and Undesirable Quality of Experience (UQOE).

The simulator 76 then performs an action based on the quality of experience level. For purposes of illustration, assume that the HMQ 72-1 has a ranking of HMQ1, and the latency value 78 is 13 milliseconds (ms). In accordance with the QOEL structure 80, the quality of experience level is a desirable quality of experience level (DQOE). In this example, the simulator 76 may begin serving the VR content 66-1 to the HMDD 14.

For purposes of additional illustration, assume that the HMQ 72-1 has a ranking of HMQ1, and the latency value 78 is 18 milliseconds (ms). In accordance with the QOEL structure 80, the quality of experience level is a moderate quality of experience level (MQOE). In this example, the simulator 76 may also begin serving the VR content 66-1 to the HMDD 14. Alternatively, the simulator 76 may send a message to the HMDD 14 indicating that the VR content 66-1 can be provided to the HMDD 144 but will not be a desirable quality of experience. The simulator 76 may, in some embodiments, request a confirmation from the user 12, via the HMDD 14, that the VR content 66-1 should be provided to the HMDD 14 even though the quality of experience level will be only a moderate quality of experience. The user 12 may manipulate an input control, such as a button on the HMDD 14 to indicate confirmation. The simulator 76 receives the confirmation from the HMDD 14, and begins providing imagery from the VR content 66-1 to the HMDD 14.

For purposes of additional illustration, assume that the HMQ 72-1 has a ranking of HMQ1, and the latency value 78 is 50 milliseconds (ms). In accordance with the QOEL structure 80, the simulator 76 determines that the quality of experience level is an undesirable quality of experience level (UQOE). In this example, the simulator 76 may send a message to the HMDD 14 indicating that the VR content 66-1 cannot be provided to the HMDD 14.

In some embodiments, the simulator 76 may utilize the quality of experience level to determine that the VR content 66-1 should be served from a different location than the national data center 42-1. As an example, assume that the HMQ 72-1 has a ranking of HMQ1, and the latency value 78 is 50 milliseconds (ms). In accordance with the QOEL structure 80, the simulator 76 determines that the quality of experience level is an undesirable quality of experience level (UQOE). The simulator 76 may then determine that one of the computing devices 22-R, 22-H, or 22-AN in the network 26-1 (FIG. 2) has a latency value between the respective computing device 22-R, 22-H, or 22-AN and the HMDD 14 that would result in a desirable quality of experience level if the VR content 66-1 was served from the respective computing device 22-R, 22-H, or 22-AN. The simulator 76 may then transfer the request to serve the VR content 66-1 to the respective computing device 22-R, 22-H, or 22-AN.

In some embodiments, the simulator 76 determines the latency values of the computing devices 22-R, 22-H, and 22-AN by sending a request to each of the computing devices 22-R, 22-H, and 22-AN to provide the respective latency value to the simulator 76. The request may include an address associated with the HMDD 14. Upon receipt of such request, each of the computing devices 22-R, 22-H, and 22-AN then determines the latency value between the respective computing devices 22-R, 22-H, and 22-AN and the HMDD 14 using, for example, the technique described above for determining the latency value 78.

Upon receipt of the latency values from the respective computing devices 22-R, 22-H, and 22-AN, the simulator 76 may determine which of the computing devices 22-R, 22-H, and 22-AN are at a highest hierarchical level in the network 26-1 and also have a latency value that will result in a desirable quality of experience level. The simulator 76 may then transfer the request from the HMDD 14 to serve the VR content 66-1 to such computing device 22-R, 22-H, or 22-AN.

As an example, assume that the simulator 76 sends a request to each of the computing devices 22-R, 22-H, and 22-AN to provide the respective latency value to the simulator 76. The request includes the destination address of the HMDD 14. Each of the computing devices 22-R, 22-H, and 22-AN determines a latency value that is associated with a round-trip time of data communicated from the respective computing device 22-R, 22-H, and 22-AN through the network 26-1 to the HMDD 14 and receipt, by the respective computing device 22-R, 22-H, and 22-AN, of a response from the HMDD 14 to the signal. Each of the computing devices 22-R, 22-H, and 22-AN then sends the determined latency value to the simulator 76. Assume that the latency value for the computing device 22-R is 15 ms, the latency value for the computing device 22-H is 12 ms, and the latency value for the computing device 22-AN is 5 ms. In accordance with the QOEL structure 80, the simulator 76 determines that any of the computing devices 22-R, 22-H, or 22-AN can provide a desirable quality of experience level. The simulator 76 determines that the computing device 22-R is at the highest hierarchical level of the network 26-1, and thus transfers the request from the HMDD 14 to serve the VR content 66-1 to the computing device 22-R.

In another embodiment, the simulator 76, rather than determine which of the computing devices 22-R, 22-H, or 22-AN should serve the VR content 66-1, merely transfers the request to the next computing device 22-R, 22-H, or 22-AN in the hierarchy, which, in this example, is the computing device 22-R. A simulator on the computing device 22-R then determines the latency value between the computing device 22-R and the HMDD 14, and if, based on the latency value and the HMQ 72-1, the computing device 22-R can provide a desirable quality of experience level, the simulator on the computing device 22-R begins serving the VR content 66-1. Otherwise, the computing device 22-R transfers the request to the next computing device 22-H or 22-AN in the hierarchy, which, in this example, is the computing device 22-H. This process repeats unless neither of the computing devices 22-H or 22-AN can provide a desirable or moderate quality of experience level. In such event, a simulator on the last computing device in the hierarchy of computing devices, in this example the computing device 22-AN, may then send a message to the HMDD 14 that the VR content 66-1 cannot be served to the HMDD 14.

Note that in some embodiments, the service provider 18, from a cost and logistics standpoint, may not equip lower levels of the network 26-1 with computing devices 22, and thus the process described above may only process one, two or three levels of the network 26-1.

Figure 4:
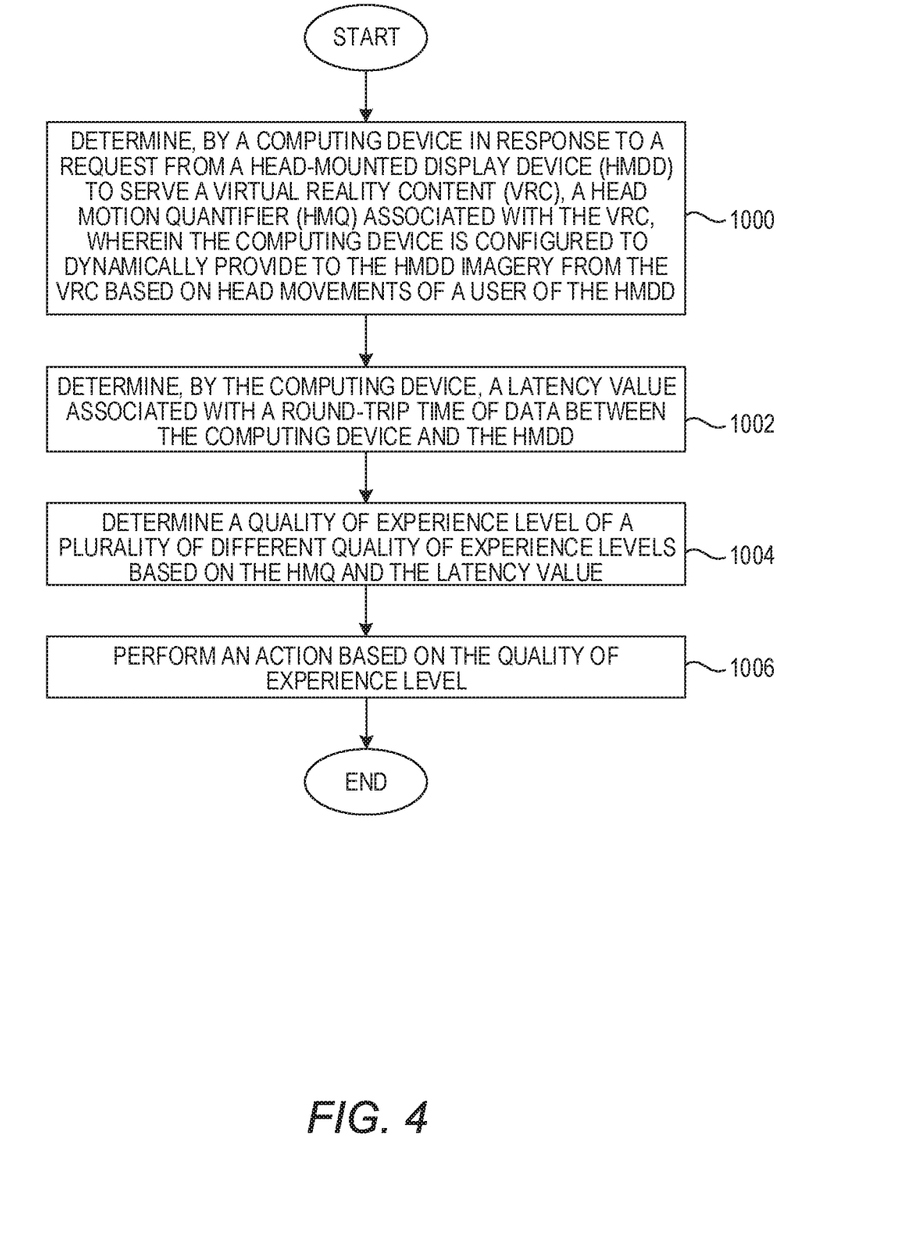
FIG. 4 is a flowchart of a method for streaming virtual reality content based on quality of experience level, according to one embodiment.

FIG. 4 is a flowchart of a method for streaming virtual reality content based on quality of experience level, according to one embodiment. FIG. 4 will be discussed in conjunction with FIG. 1. The computing device 22 determines, in response to a request from the HMDD 14 to serve the VR content 66-1, the HMQ 72-1 associated with the VR content 66-1. The computing device 22 is configured to dynamically provide to the HMDD 14 imagery from the VR content 66-1 based on head movements of the user 12 of the HMDD 14 (FIG. 4, block 1000). The computing device 22 determines the latency value 78 associated with a round-trip time of data between the computing device 22 and the HMDD 14 (FIG. 4, block 1002). The computing device 22 determines a quality of experience level based on the HMQ 72-1 and the latency value 78 (FIG. 4, block 1004). The computing device 22 performs an action based on the quality of experience level (FIG. 4, block 1006).

Figure 5:
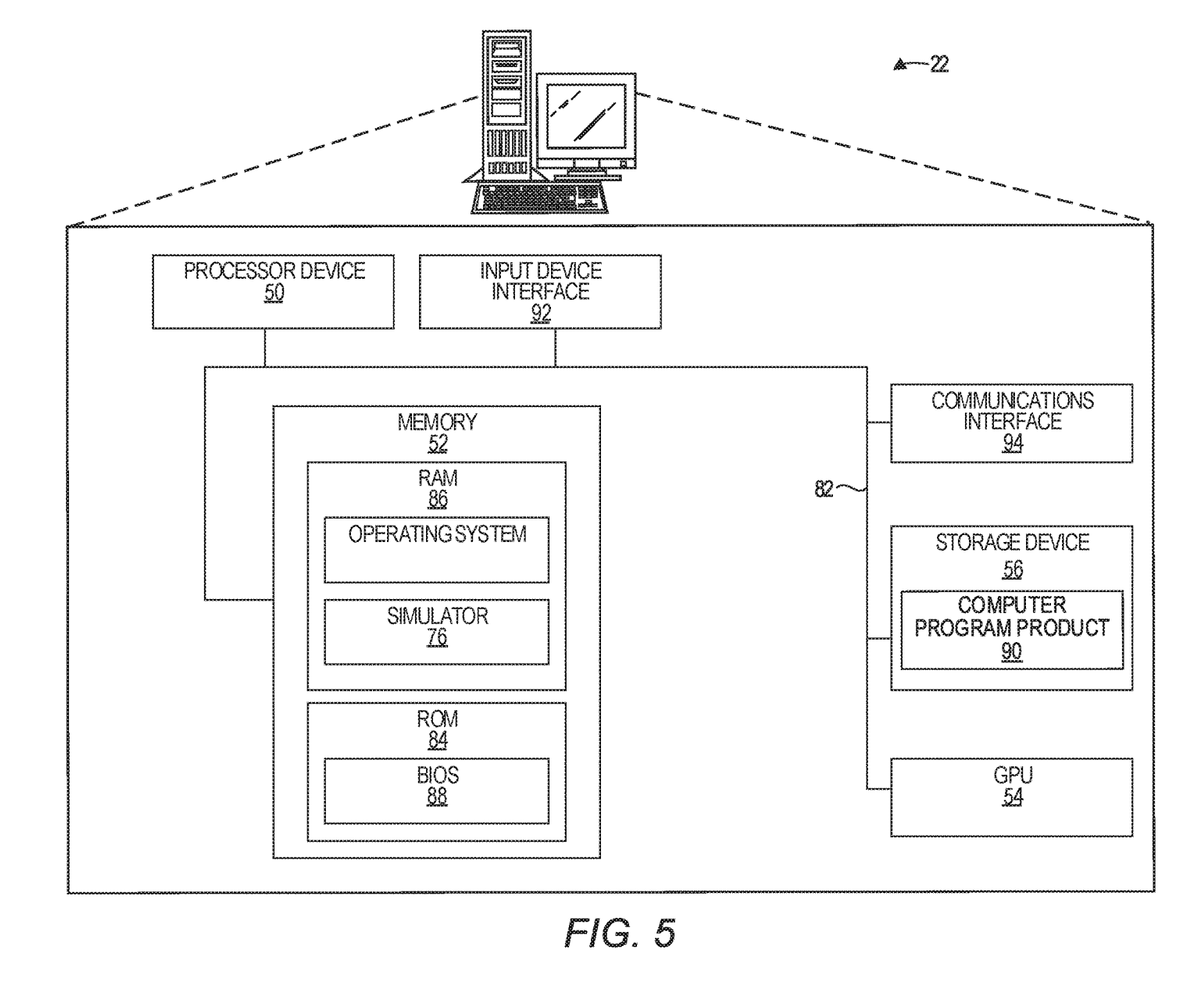
FIG. 5 is a block diagram of a computing device suitable for implementing examples according to one example.

FIG. 5 is a block diagram of the computing device 22 suitable for implementing examples according to one example. The computing device 22 may comprise any computing or electronic device capable of including firmware, hardware, and/or executing software instructions to implement the functionality described herein, such as a computer server or the like. The computing device 22 includes the processor device 50, the memory 52, and a system bus 82. The system bus 82 provides an interface for system components including, but not limited to, the memory 52 and the processor device 50. The processor device 50 can be any commercially available or proprietary processor.

The system bus 82 may be any of several types of bus structures that may further interconnect to a memory bus (with or without a memory controller), a peripheral bus, and/or a local bus using any of a variety of commercially available bus architectures. The memory 52 may include non-volatile memory 84 (e.g., read-only memory (ROM), erasable programmable read-only memory (EPROM), electrically erasable programmable read-only memory (EEPROM), etc.), and volatile memory 86 (e.g., random-access memory (RAM)). A basic input/output system (BIOS) 88 may be stored in the non-volatile memory 84 and can include the basic routines that help to transfer information between elements within the computing device 22. The volatile memory 86 may also include a high-speed RAM, such as static RAM, for caching data.

The computing device 22 may further include or be coupled to a non-transitory computer-readable storage medium such as the storage device 56, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 56 and other drives associated with computer-readable media and computer-usable media may provide non-volatile storage of data, data structures, computer-executable instructions, and the like.

A number of modules can be stored in the storage device 56 and in the volatile memory 86, including an operating system and one or more program modules, such as the simulator 76, which may implement the functionality described herein in whole or in part. All or a portion of the examples may be implemented as a computer program product 90 stored on a transitory or non-transitory computer-usable or computer-readable storage medium, such as the storage device 56, which includes complex programming instructions, such as complex computer-readable program code, to cause the processor device 50 to carry out the steps described herein. Thus, the computer-readable program code can comprise software instructions for implementing the functionality of the examples described herein when executed on the processor device 50. The processor device 50, in conjunction with the simulator 76 in the volatile memory 86, may serve as a controller, or control system, for the computing device 22 that is to implement the functionality described herein.

An operator may also be able to enter one or more configuration commands through a keyboard, a pointing device such as a mouse (not illustrated), or a touch-sensitive surface such as a display device. Such input devices may be connected to the processor device 50 through an input device interface 92 coupled to the system bus 82 but can be connected through other interfaces such as a parallel port, an Institute of Electrical and Electronic Engineers (IEEE) 1394 serial port, a Universal Serial Bus (USB) port, an IR interface, and the like.

The computing device 22 may also include a communications interface 94 suitable for communicating with the network 26-1 as appropriate or desired. The computing device 22 includes one or more GPUs 54.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
receiving, by a computing device, a request from a head-mounted display device (HMDD) to serve first virtual reality (VR) content of a plurality of different VR contents streamable by the computing device, each respective VR content of the plurality of VR contents having a corresponding predetermined head motion quantifier (HMQ), each predetermined HMQ quantifying a rotational velocity of a head of a nominal user participating in the respective VR contents, wherein the computing device is configured to dynamically provide, to the HMDD, imagery from the VR content based on head movements of a user of the HMDD;
obtaining, by the computing device in response to the request, the predetermined HMQ associated with the first VR content;
determining, by the computing device, a latency value associated with a round-trip time of data between the computing device and the HMDD;
determining, by the computing device, a quality of experience level of a plurality of different quality of experience levels based on the predetermined HMQ and the latency value; and
performing, by the computing device, an action based on the quality of experience level.

2. The method of claim 1 wherein the quality of experience level is an undesirable quality of experience level; and
wherein performing the action based on the quality of experience level comprises sending, to the HMDD, a message indicating that the first VR content cannot be provided to the HMDD.

3. The method of claim 1 wherein the quality of experience level is between an undesirable quality of experience level and a desirable quality of experience level; and
wherein performing the action based on the quality of experience level comprises sending, to the HMDD, a message indicating that the first VR content can be provided to the HMDD but will not be a desirable quality of experience.

4. The method of claim 3 wherein sending, to the HMDD, the message indicating that the first VR content can be provided to the HMDD but will not be a desirable quality of experience further comprises:
requesting a confirmation from the HMDD that the first VR content should be provided to the HMDD;
receiving, from the HMDD, the confirmation that the first VR content should be provided to the HMDD; and
in response to receiving the confirmation, begin providing imagery from the first VR content to the HMDD.

5. The method of claim 1 wherein the quality of experience level is a desirable quality of experience level, and wherein performing the action based on the quality of experience level comprises providing the imagery from the first VR content to the HMDD.

6. The method of claim 1 wherein:
the computing device communicates with the HMDD via a communications path that includes one or more other computing devices in a network of computing devices;
wherein the quality of experience level is an undesirable quality of experience level; and
wherein performing the action based on the quality of experience level comprises:
determining that a first computing device of the one or more other computing devices has a latency value associated with a round-trip time of data between the first computing device and the HMDD that would result in a desirable quality of experience level if the first VR content was served from the first computing device; and
transferring the request from the HMDD to serve the first VR content to the first computing device.

7. The method of claim 6 wherein determining that the first computing device of the one or more other computing devices has the latency value associated with the round-trip time of data between the first computing device and the HMDD that would result in the desirable quality of experience level if the first VR content was served from the first computing device further comprises:
sending, by the computing device to the first computing device, a request to provide the latency value associated with the round-trip time of data between the first computing device and the HMDD; and
receiving, from the first computing device, the latency value.

8. The method of claim 6 wherein determining that the first computing device of the one or more other computing devices has the latency value associated with the round-trip time of data between the first computing device and the HMDD that would result in the desirable quality of experience level if the first VR content was served from the first computing device further comprises:
sending, by the computing device to the first computing device and to a second computing device of the one or more other computing devices, a request to provide the latency value associated with the round-trip time of data between the first computing device and the HMDD and a latency value associated with a round-trip time of data between the second computing device and the HMDD, respectively;
receiving a first latency value from the first computing device;
receiving a second latency value from the second computing device;
determining that the first latency value would result in the desirable quality of experience level; and
determining that the second latency value would not result in the desirable quality of experience level.

9. The method of claim 6 wherein determining that the first computing device of the one or more other computing devices has the latency value associated with the round-trip time of data between the first computing device and the HMDD that would result in the desirable quality of experience level if the first VR content was served from the first computing device further comprises:
sending, by the computing device to the first computing device and to a second computing device of the one or more other computing devices, a request to provide the latency value associated with the round-trip time of data between the first computing device and the HMDD and a latency value associated with a round-trip time of data between the second computing device and the HMDD, respectively;
receiving a first latency value from the first computing device;
receiving a second latency value from the second computing device;
determining that the first latency value and the second latency value would result in the desirable quality of experience level;
determining that the first computing device is at a higher hierarchical level in the network of computing devices; and
in response to determining that the first computing device is at a higher hierarchical level in the network of computing devices, transferring the request from the HMDD to serve the first VR content to the first computing device.

10. The method of claim 1 wherein the computing device communicates with the HMDD via a communications path that includes one or more other computing devices in a network of computing devices;
wherein the quality of experience level is an undesirable quality of experience level; and
wherein performing the action based on the quality of experience level comprises:
transferring, to a next computing device in the communications path, the request from the HMDD to serve the first VR content.

11. The method of claim 1 wherein determining, by the computing device, the latency value associated with the round-trip time of data between the computing device and the HMDD comprises:
sending, by the computing device, an internet control message protocol (ICMP) echo request to the HMDD;
receiving, by the computing device from the HMDD, a response to the ICMP echo request; and
determining an amount of time between sending the ICMP echo request and receiving the response to the ICMP echo request.

12. The method of claim 1 wherein obtaining the predetermined HMQ associated with the first VR content comprises:

accessing metadata of the first VR content that identifies the predetermined HMQ associated with the first VR content.

13. A computing device, comprising:
a memory; and
a processor device coupled to the memory configured to:
receive a request from a head-mounted display device (HMDD) to serve first virtual reality (VR) content of a plurality of different VR contents streamable by the computing device, each respective VR content of the plurality of VR contents having a corresponding predetermined head motion quantifier (HMQ), each predetermined HMQ quantifying a rotational velocity of a head of a nominal user participating in the respective VR contents, wherein the computing device is configured to dynamically provide, to the HMDD, imagery from the VR content based on head movements of a user of the HMDD;
obtain, in response to the request, the predetermined HMQ associated with the first VR content;
determine a latency value associated with a round-trip time of data between the computing device and the HMDD;
determine a quality of experience level of a plurality of different quality of experience levels based on the predetermined HMQ and the latency value; and
perform an action based on the quality of experience level.

14. The computing device of claim 13 wherein the quality of experience level is an undesirable quality of experience level; and
wherein to perform the action based on the quality of experience level, the processor device is further configured to send, to the HMDD, a message indicating that the first VR content cannot be provided to the HMDD.

15. The computing device of claim 13 wherein:
the computing device communicates with the HMDD via a communications path that includes one or more other computing devices in the network of computing devices;
wherein the quality of experience level is an undesirable quality of experience level; and
wherein to perform the action based on the quality of experience level, the processor device is further configured to:
determine that a first computing device of the one or more other computing devices has a latency value associated with a round-trip time of data between the first computing device and the HMDD that would result in a desirable quality of experience level if the first VR content was served from the first computing device; and
transfer the request from the HMDD to serve the first VR content to the first computing device.

16. The computing device of claim 13 wherein the computing device communicates with the HMDD via a communications path that includes one or more other computing devices in the network of computing devices;
wherein the quality of experience level is an undesirable quality of experience level; and wherein to perform the action based on the quality of experience level, the processor device is further configured to:
transfer, to a next computing device in the communications path, the request from the HMDD to serve the first VR content.

17. A computer program product stored on a non-transitory computer-readable storage medium and including instructions configured to cause a processor device to:
receive a request from a head-mounted display device (HMDD) to serve first virtual reality (VR) content of a plurality of different VR contents streamable by the computing device, each respective VR content of the plurality of VR contents having a corresponding predetermined head motion quantifier (HMQ), each predetermined HMQ quantifying a rotational velocity of a head of a nominal user participating in the respective VR contents, wherein the computing device is configured to dynamically provide, to the HMDD, imagery from the VR content based on head movements of a user of the HMDD;
obtain, in response to the request, the predetermined HMQ associated with the first VR content;
determine a latency value associated with a round-trip time of data between the computing device and the HMDD;
determine a quality of experience level of a plurality of different quality of experience levels based on the predetermined HMQ and the latency value; and
perform an action based on the quality of experience level.

18. The computer program product of claim 17 wherein the quality of experience level is an undesirable quality of experience level; and
wherein to perform the action based on the quality of experience level, the instructions further cause the processor device to send, to the HMDD, a message indicating that the first VR content cannot be provided to the HMDD.

19. The computer program product of claim 17 wherein:
the computing device communicates with the HMDD via a communications path that includes one or more other computing devices in the network of computing devices;
wherein the quality of experience level is an undesirable quality of experience level; and
wherein to perform the action based on the quality of experience level, the instructions further cause the processor device to:
determine that a first computing device of the one or more other computing devices has a latency value associated with a round-trip time of data between the first computing device and the HMDD that would result in a desirable quality of experience level if the first VR content was served from the first computing device; and
transfer the request from the HMDD to serve the first VR content to the first computing device.

* * * * *